(12) United States Patent
Rainey

(10) Patent No.: US 9,464,620 B2
(45) Date of Patent: Oct. 11, 2016

(54) WAVE ENERGY MACHINE

(75) Inventor: Roderick Charles Tasman Rainey, Somerset (GB)

(73) Assignee: Checkmate Limited, Sheerness (GB)

( * ) Notice: Subject to any disclaimer, the term of this patent is extended or adjusted under 35 U.S.C. 154(b) by 684 days.

(21) Appl. No.: 14/423,241

(22) PCT Filed: Jan. 16, 2012

(86) PCT No.: PCT/IB2012/050202
§ 371 (c)(1),
(2), (4) Date: Feb. 23, 2015

(87) PCT Pub. No.: WO2012/095832
PCT Pub. Date: Jul. 19, 2012

(65) Prior Publication Data
US 2015/0192102 A1    Jul. 9, 2015

(30) Foreign Application Priority Data

Jan. 14, 2011    (GB) .................................. 1100606.1

(51) Int. Cl.
*F03B 13/24*    (2006.01)
*F03B 13/14*    (2006.01)
*F03B 13/22*    (2006.01)
*F03B 13/18*    (2006.01)

(52) U.S. Cl.
CPC ........... *F03B 13/188* (2013.01); *F03B 13/148* (2013.01); *F03B 13/22* (2013.01); *F03B 13/24* (2013.01); *F05B 2250/611* (2013.01); *Y02E 10/38* (2013.01)

(58) Field of Classification Search
CPC ...... Y02E 10/38; F03B 13/14; F03B 13/148; F03B 13/16; F03B 13/188; F03B 13/24
See application file for complete search history.

(56) References Cited

U.S. PATENT DOCUMENTS

| 4,164,383 A * | 8/1979 | French | F03B 13/188 |
| | | | 290/53 |
| 2009/0007557 A1* | 1/2009 | Farley | F03B 13/148 |
| | | | 60/398 |

FOREIGN PATENT DOCUMENTS

| GB | 2050522 A * | 1/1981 | ............ F03B 13/148 |
| GB | 2061395 A * | 5/1981 | ............... E02B 9/08 |
| GB | 2081387 | 2/1982 | |
| GB | WO 2011055111 A2 * | 5/2011 | ............ F03B 13/188 |
| IE | WO 2010007607 A1 * | 1/2010 | ............ F03B 13/188 |
| WO | 8400583 | 2/1984 | |
| ZA | WO 2010067177 A2 * | 6/2010 | ............ F03B 13/142 |

OTHER PUBLICATIONS

Written Opinion of the International Searching Authority for International patent application serial No. PCT/IB2012/050202.

* cited by examiner

*Primary Examiner* — Audrey K Bradley
(74) *Attorney, Agent, or Firm* — Haugen Law Firm PLLP

(57) ABSTRACT

This invention relates to a device and method for extracting energy from surface waves in a body of water, for example, the sea. A wave energy device (1) for extracting energy from surface waves in a body of water includes an elongate and flexible tubular body (2) having an outer wall (4) and within the outer wall a channel (6) that extends along the length of the tubular body (2). The device is positioned in a body of water so that, in use, the elongate body (2) extends along the water surface (15) in the direction of surface waves with water contained within the channel being driven to form a series of bulge waves that travel along the length of the channel as the tubular body flexibly follows the movement of the waves. The device harnesses energy from the bulge waves for providing useful power.

17 Claims, 6 Drawing Sheets

WAVE ENERGY MACHINE

BACKGROUND a. Field of the Invention

This invention relates to a device and a method for extracting energy from surface waves in a body of water, for example, the sea.

b. Related Art

Deep water wave power resources are truly enormous. It has been estimated that The UK has an estimated recoverable resource of between 50-90 TWh of electricity a year; this is roughly 15-25% of the current UK electricity demand. Worldwide, the useful worldwide resource has been estimated to be greater than 8700 TWh per year.

One type of wave energy device is disclosed in patent document WO 2007/088325 A1. This relates to a distensible tube wave energy converter, formed from an elongate distensible tubular body which has an elastic outer wall entrains a bulge wave generated by wave passing over the device. Large storm waves pose a challenge to wave power development. Because the wave energy power take off is at one or both ends, the bulge wave energy at the take off will increase as the wave amplitude increases. This presents a problem in that the device may be over-stressed in very high seas.

It is an object of the invention to provide a wave energy device that deals with this issue.

SUMMARY OF THE INVENTION

According to the invention, there is provided a wave energy device for extracting energy from surface waves in a body of water, comprising:
- an elongate and flexible tubular body, said tubular body having an outer wall and within the outer wall a channel that extends along the length of the tubular body;
- means for positioning said tubular body in a body of water so that, in use, said tubular body extends along the water surface in the direction of said waves with water contained within the channel being driven by said waves to form a series of bulge waves that travel along the length of the channel as the flexible tubular body flexibly follows the movement of said waves; and
- energy harnessing means for providing useful power from the bulge wave;
- wherein said tubular body has within the outer wall a plurality of deformable chambers spaced along at least a portion of the length of said tubular body, said chambers each holding a fluid and being separated from the channel so that as each of said bulge waves travels along the length of the channel the volume of each chamber is alternately compressed and expanded by the travelling bulge waves with consequent changes of pressure in said fluid held by each chamber, the energy harnessing means being arranged to extract energy from said pressure changes in said fluid so that energy is extracted from said bulge waves as each bulge wave travels along the length of the channel.

The chambers are spaced apart along at least a portion of the length of the tubular body, and preferably along the full length or substantially the full length.

The wave energy device can therefore extract energy from the bulge wave at a plurality of locations along length of the tubular body to limit the growth of the bulge wave as this travels along the length of the channel.

In a preferred embodiment of the invention, each of the chambers is separated from the channel by an inner wall. The inner wall is then movable relative to the outer wall so that the transverse cross-sectional area of the channel can expand and contract as each bulge wave travels along the length of the channel, the energy harnessing means thereby being driven by this movement of the inner wall.

The inner wall has on one side the fluid chamber and in a preferred embodiment of the invention, the inner wall has on the opposite side the bulge wave channel. The bulge wave is then contained by the inner wall and a portion of the outer wall beyond the bounds of the fluid chamber.

The outer wall is flexible yet may be substantially inelastic so that this does not distend to any significant degree under the passage of a bulge wave. The inner wall may be relatively more distensible than the outer wall so that as the bulge wave travels along the length of the channel, the volume of each chamber is alternately compressed and expanded by the passage of the bulge wave. The energy harnessing means is thereby driven by the cyclical pressure changes in the fluid from the chambers to provide useful power.

In a preferred embodiment of the invention, the tube provides an envelope that is extendable in a circumferential direction. In the preferred embodiment, this is needed to accommodate the passage of the bulge wave along the length of the channel, particularly when the energy harnessing means is not drawing power from the chamber, as then the compression or expansion of the chamber will be more limited than when chamber is being used to supply power to the energy harnessing means.

Also in a preferred embodiment of the invention, the tubular body has a generally hollow interior that is divided by the inner wall to form the channel and the plurality of chambers.

The channel will, in general, be open at one or both ends and may hold a quantity of water within the tubular body provided by the body of water in which the device is moored. The channel may extend continuously along the full length of the tubular body so that a bulge wave may travel unimpeded, for example by any one-way valves, along the length of the tubular body.

The device may include a mooring point towards or at one end of the elongate tubular body.

The outer wall may be formed from a flexible outer membrane that is extensible in the longitudinal direction and substantially inextensible in the circumferential direction, so that this resists being distended circumferentially by the bulge wave The fluid may be a gas for example air, or a liquid, for example water. The energy harnessing means may therefore include either an air-driven turbine or a water-driven turbine. In a preferred embodiment of the invention, the fluid is air.

It is a particular advantage of the invention that the energy harnessing means, in use, extracts energy from the fluid held by the chambers as each bulge wave travels along the length of the channel. This helps to prevent a bulge wave from growing too large or placing any undue stress on the outer wall.

The extraction of energy from the fluid in each of the chambers therefore serves to limit the growth of the energy conveyed by a bulge wave as this travels along the length of the channel.

In general, the device may comprise buoyancy means so that, in use, the wave energy device is only partially submerged. The bulge wave is then generated by water flowing downhill within the channel. This is in contrast to the prior art in which a fully distensible outer wall is fully submerged and substantially level, the bulge wave then being generated by pressure gradients as wave pass over the submerged tube.

The fluid may be compressible or substantially incompressible. When the fluid is a compressible gas, the chambers may advantageously be provided in an upper portion of the tubular body, to aid with buoyancy and to keep the tubular body correctly oriented so that the bulge wave pressure acts upwards on the chamber.

Preferably, each of the inner walls forming a chamber is affixed to the outer wall around the periphery of the corresponding chamber. The inner wall may also be saddle-shaped.

The stiffness of the outer wall in the circumferential direction is preferably greater than the stiffness of the outer wall in the longitudinal direction, so that the tubular body may follow the undulations of the passing waves while substantially containing the bulge wave within the outer wall.

The outer wall may therefore be formed of an elastomeric material with circumferential reinforcement to limit circumferential expansion of the outer wall, but allow longitudinal expansion and contraction of the outer wall.

The energy harnessing means is, in a preferred embodiment of the invention, driven by a flow of the fluid into and out of each chamber stemming from the pressure changes resulting from the alternate compression and expansion of the volume of each chamber.

The energy harnessing means may comprise at least one accumulator for receiving or providing a flow of the fluid from or to at least one of the chambers, means for controlling the flow of the fluid, and an energy conversion device for providing the power from the flow.

Preferably, there is a pair of accumulators, one for receiving a flow of the fluid from at least one of the chambers when compressed by the approach of a bulge wave and one for providing a flow of the fluid to at least one of the chambers when expanded by the passage of a bulge wave. The, or each, accumulator is preferably positioned outside the bulge wave channel and most preferably outside the outer wall of the device, so as not to physically interfere with the bulge wave generation and chamber deformation.

When the fluid is a gas, the, or each, accumulator is preferably positioned substantially above the tubular body to provide buoyancy to the wave energy device.

In a preferred embodiment of the invention, the means for controlling the flow of fluid comprises at least one one-way valve between each of the chambers and the, or each, accumulator. Each valve is then automatically actuated by a pressure difference across the valve between the chamber and an accumulator. The may, for example, be a flap valve.

The accumulators may extend along the length of the tubular body, and most preferably along an upper portion of the tubular body. The, or each, accumulator may then act to distribute the energy extracted from the fluid held by the chambers as each bulge wave travels along the length of the channel. This help to even out pressure fluctuations in the accumulators as energy is extracted from each individual chamber.

Also according to the invention, there is provided a method of extracting energy from surface waves in a body of water using a wave energy device, said device comprising an elongate and flexible tubular body, said tubular body having an outer wall and separate from the outer wall a plurality of deformable chambers spaced along at least a portion of the length of said tubular body, and energy harnessing means for providing useful power, the method comprising the steps of:

positioning said tubular body in a body of water so that said tubular body extends along the water surface in the direction of surface waves with water contained within the channel being driven to form a series of bulge waves that travel along the length of the channel as the flexible tubular body flexibly follows the movement of said waves, said volume of said chambers expanding and contracting in response to the travelling bulge waves with consequent changes of pressure in said fluid held by each chamber;

extracting energy from said bulge waves as each bulge wave travels along the length of the channel by using the energy harnessing means to provide said useful power from energy extracted from said pressure changes in said fluid.

The plurality of deformable chambers each holds a fluid, the response of each chamber to the passage of each bulge wave being a cyclical compression of the fluid. The cyclical compression of the fluid held by the chambers then drives the energy harnessing means to provide the useful power.

BRIEF DESCRIPTION OF THE DRAWINGS

The invention will now be further described, by way of example only, with reference to the accompanying drawings, in which.

DETAILED DESCRIPTION

Figure 1:
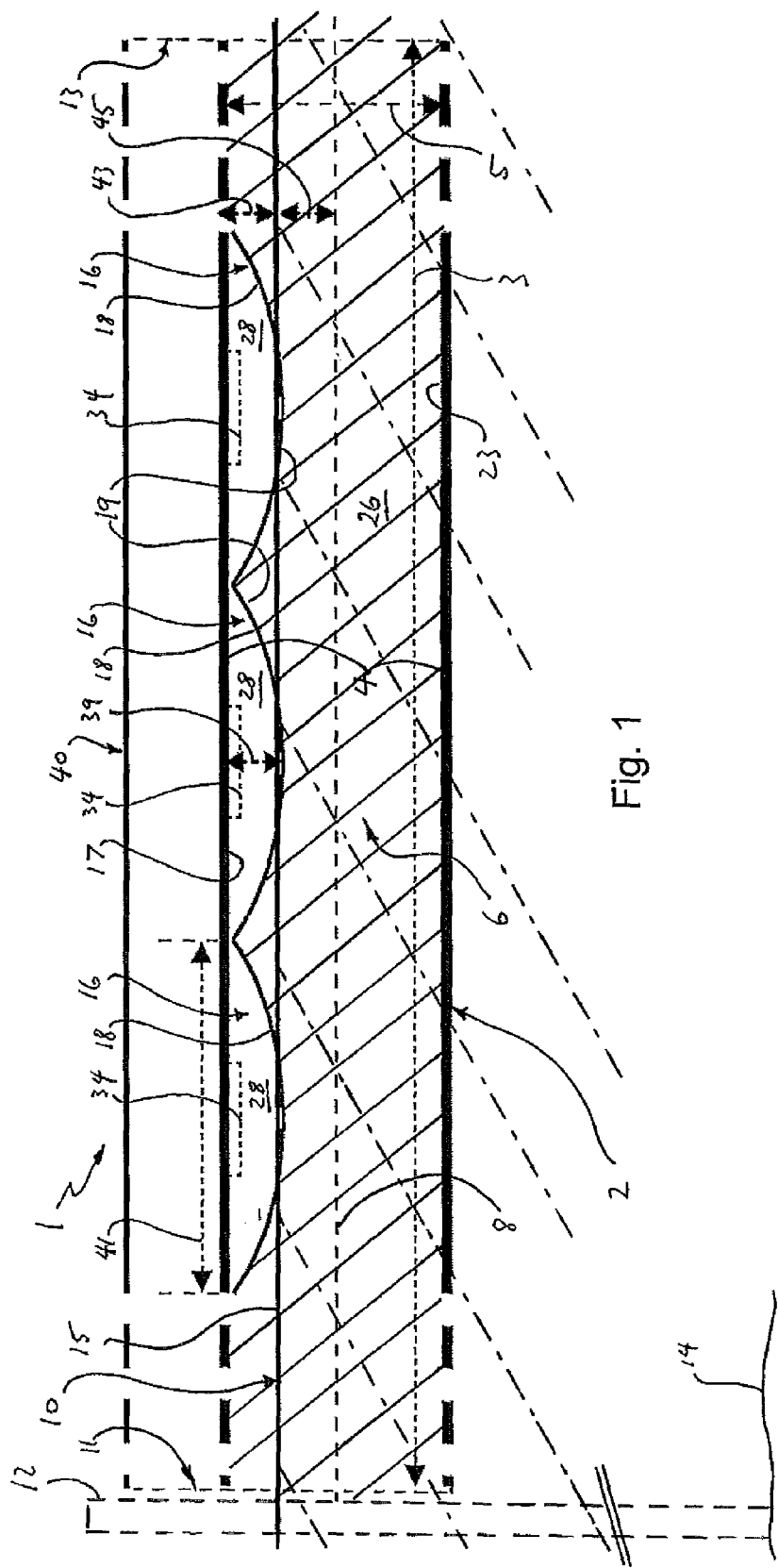
FIG. 1 is a schematic view in a vertical plane of a cross-section extending along the length of a wave energy device for extracting energy from surface waves in a body of water according to a preferred embodiment of the invention, showing a series of chambers extending along an upper interior portion of an elongate tubular body with a continuous channel extending below.

FIG. 1 shows schematically a cross-section through an elongate wave energy device 1 for extracting energy from surface waves in a body of water 10 for example the open sea. The device 1 has an elongate and flexible tubular body 2 with a substantially circular cross-section (see FIGS. 2 and 3) and that has an outer wall 4 and within the outer wall a channel 6 that extends unobstructed along the length of the tubular body. The tubular body 2 has a length 3 of 400 m and a width 5 of 2.5 m. The channel extends fully around a central axis 8 of the tubular body 2 and is formed between two layers of the tubular body 2.

The tubular body is moored at one end 11 to a mooring, for example a pile 12 or other structure secured to the seabed 14. The tubular body is free to swing around the mooring depending on the wave direction, with an opposite end 13 floating freely on the sea surface 15. The channel 6 is open at both ends 11, 13 of the body 2.

Also contained within the tubular body 2 is a plurality of air-filled deformable chambers 16 located in an uppermost portion of the tubular body 2. Each chamber contains a working fluid 28, which in this example is air. As will be explained in more detail below, the chambers are used both in the generation of travelling bulge waves contained by the tubular body and at least some of the chambers are used to extract energy from the travelling bulge wave.

The chambers 16 are spaced apart along at least a portion of the length of the body, and preferably along substantially the full length. The chambers are preferably evenly spaced and those chambers which are used for energy extraction are provided at least in a down-wave half of the body 2 towards the un-moored end 13. Chambers not used for energy extraction, but used to permit the growth of a bulge wave, may then be provided in an up-wave portion of the body.

An upper portion of the chambers 16 is bounded by a top-most portion 17 of the outer wall 4 and a lower portion of the chambers is bounded by an elastic inner wall 18. The inner wall 18 separates each chamber 16 from the channel 6, and so the channel is bounded on an upper side 19 by the inner wall 18 and on left/right lateral sides 21 (see FIGS. 2 and 3) and lowermost side 23 by the outer wall 4.

Figure 2:
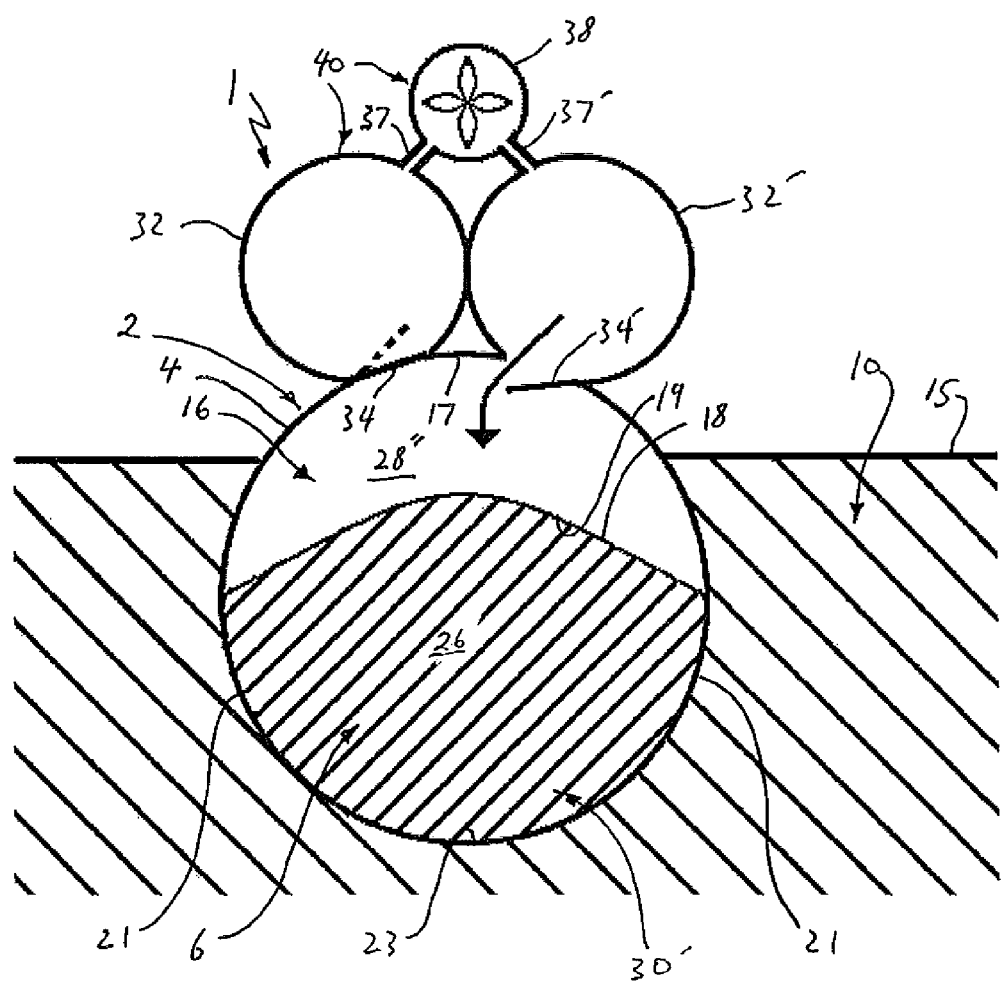
FIG. 2 is a schematic view in a vertical plane extending in a cross-section perpendicular to that of FIG. 1, showing how a chamber when expanded downwards draws air in to the chamber from a first tubular accumulator.
Figure 3:
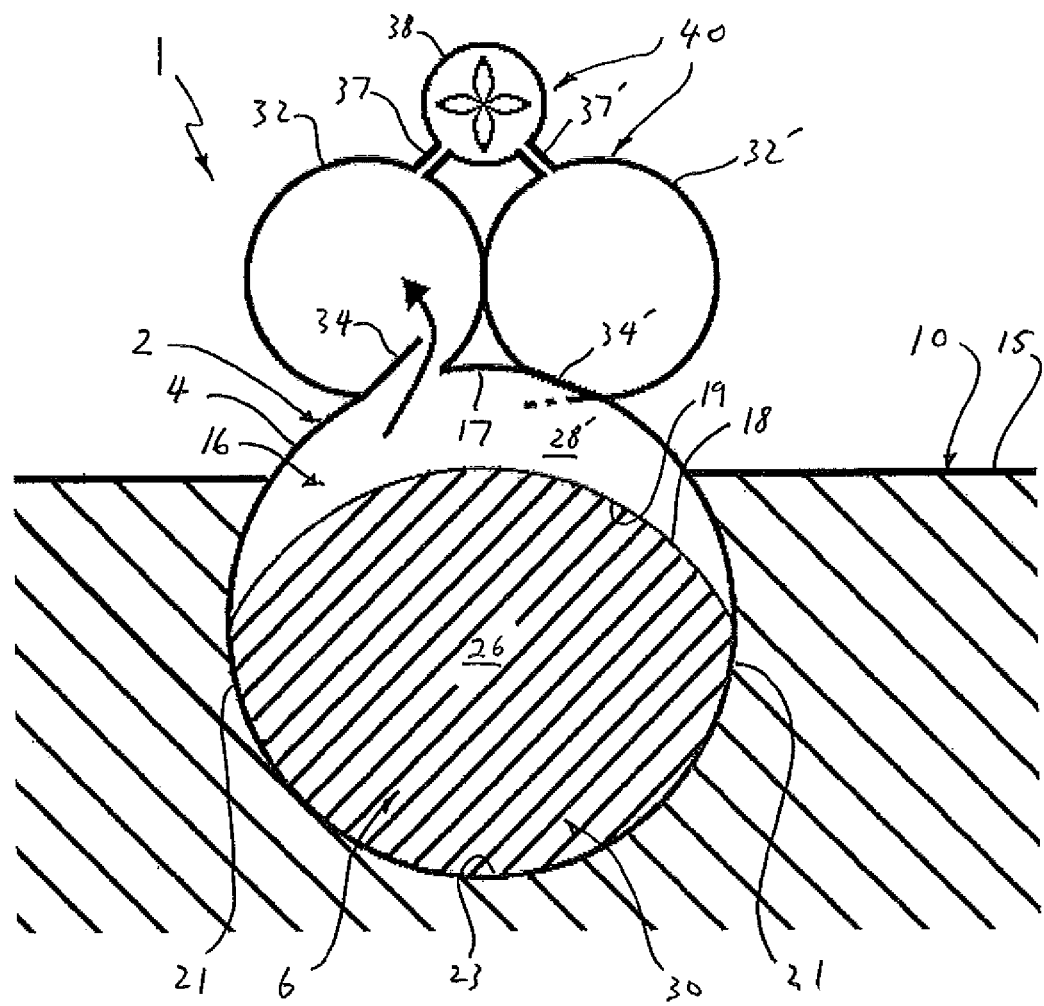
FIG. 3 is a is a schematic view similar to that of FIG. 2 showing how a chamber when compressed forces air from the chamber into a second tubular accumulator.
Figure 6:
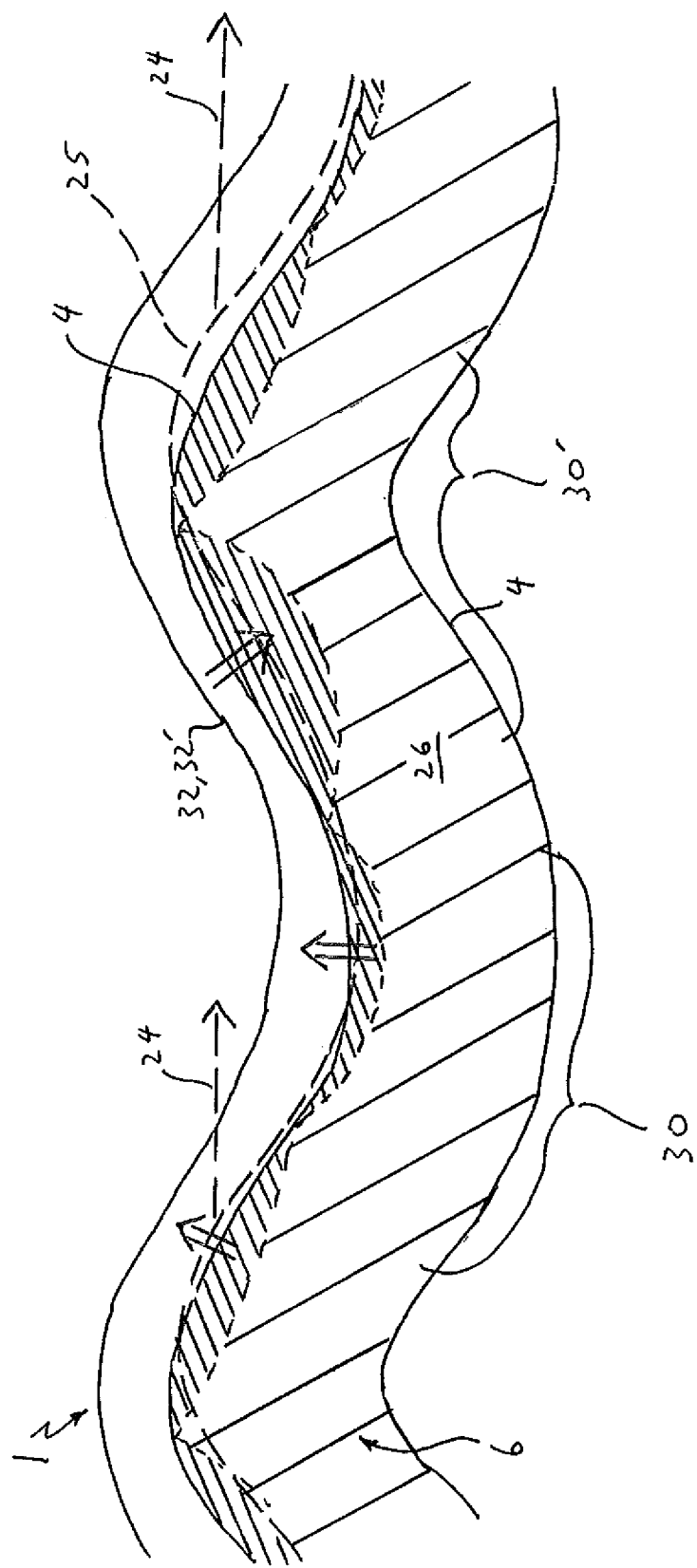
FIG. 6 is a schematic drawings showing how the wave energy device rides undulating surface waves in a body of water to generate series of internal bulge waves which alternately compress and expand the series of chambers within the elongate tubular body.

With reference now also to FIGS. 2, 3 and 6, in use, the elongate body 2 extends along the water surface 15 in the direction 24 of surface waves 25 with water 26 contained within the channel 6 being driven to form a series of bulge waves with alternating maxima 30 and minima 30' that tend to grow as these travel along the length of the channel from the up-wave end 11 to the down-wave end 13 as the flexible tubular body 2 flexibly follows the movement of the waves.

The outer layer 4 is reinforced circumferentially, but not longitudinally. Rubber segments are provided in the lower half of the tube to facilitate the bending needed for the tubular body to follow the undulations of the waves 25.

The outer envelope provided by the outer wall 4 is relatively flexible by substantially inextensible in the circumferential direction. There may be some minor distension of the outer wall by each of the bulge wave maxima 30, but the bulge wave carried by the water 26 within the channel 6 is mostly accommodated by movement of the inner wall which is relatively more distensible than the outer wall. Therefore, as the bulge wave 30, 30' travels along the length of the channel 6, the volume of each chamber is alternately compressed 28' and expanded 28" by the approach and passage of the bulge wave.

In this example, the inner wall is formed of an elastomeric material, for example rubber sheet, which can stretch to accommodate this movement The inner layer 18 is reinforced longitudinally, but not radially, and bulges upwardly inwards to form the air-filled chamber 16. The inner wall 18 may, however be formed from other materials or have other configurations that permit the volume of the air 28 within the chamber 16 vary as the bulge wave passes. For example, the inner wall may be formed from a flexible but inelastic material which has pleats or fold lines or is otherwise provided with surplus material so that the material of the inner wall can move to permit the volume contained within the chamber to vary as each bulge wave passes.

The inner wall 18 is therefore relatively more distensible than the outer wall 4 so that as the bulge wave 30, 30' travels along the length of the channel 6, the volume of each chamber 16 is alternately compressed 28' and expanded 28" by the passage of the bulge wave.

The wave energy device 1 also includes an energy harnessing means 40 for providing useful power from the bulge wave 30, 30', including a pair of elongate accumulators 32, 32', one of which 32 is a high pressure accumulator and the other of which 32' is a low pressure accumulator 32'. Each accumulator 32, 32' is positioned along the along the top 17 of the tubular body 2 and extends the full length of the tubular body. The high pressure accumulator 32 is connected to each chamber 16 by means of a chamber outlet valve 34 and the low pressure accumulator 32' is connected to each chamber 16 by means of a chamber inlet valve 34'. The chamber outlet valve 34 is a passive pressure difference operated flap valve that allows air to pass under relatively high pressure from the chamber into a the high pressure accumulator 32, and the chamber inlet valve 34' is also a passive pressure difference operated flap valve that allows air to pass under relatively low pressure from the chamber into a the high pressure accumulator. As shown in FIG. 2, when the volume of the chamber 16 is increased during passage of a bulge wave minimum 30', the air pressure in the chamber drops below that in the low pressure accumulator 32' and the inlet valve 34' opens inwards to the chamber to allow a flow 36' of air to pass from the low pressure accumulator 32' into the chamber 16. As shown in FIG. 3, when the volume of the chamber 16 is decreased during passage of a bulge wave maximum 30, the air pressure in the chamber rises above that in the high pressure accumulator 32 and the outlet valve 34 opens inwards to the high pressure accumulator 32 to allow a flow 36 of air to pass from the chamber 16 into the high pressure accumulator 32.

The energy harnessing means 40 also includes at least one turbine/generator 38 connected between the accumulators 32, 32'. For convenience, the turbine/generator is shown schematically above and between the accumulators. The turbine/generator 38 would, however, be positioned in a more convenient location, for example inside the mooring structure 12. It is then only necessary to run connecting hoses 37, 37' between the accumulators 32, 32' and the turbine/generator 38.

The difference in gas pressure between the high and low pressure accumulators 32, 32' can then be used to drive the turbine/generator 38 to generate electricity.

Conventional control and conversion electronics (not shown) can then be used to convert the generated power to the correct frequency and voltage for onward transmission to the electrical distribution grid.

As mentioned above, there are very significant advantages in using air instead or water as the working fluid in the power take-off. Pressure losses in ducting are proportional to the fluid density, and thus reduce by a factor 500 (the water/air density ratio at typical air pressures). It therefore becomes feasible to have the plurality of power take-offs along the device, interconnected by ducting, as described above. This is a "distributed power take-off". As compared with the wave power device disclosed in WO 2007/088325 A1, a distributed power take-off permits the device to tap off the energy in the bulge wave instead of allowing the bulge wave to grow in power until this reaches a power take off at a down-wave end of the device. In other words, the invention provides the ability for the tubular body to shed power in higher sea states.

The distributed power take-off therefore protects the tube rubber from fatigue, by limiting pressures, and protects the whole tube, thus allowing all the rubber in it to be operated at much higher stored energy levels, without causing fatigue. The tube is therefore considerably cheaper to manufacture.

The accumulators can also be based on air compression, which stores sufficient energy for a distributed power take-off. This is a cheaper and easier option than elastic or gravitational accumulators.

A further benefit is that the mixing losses at the turbine exit drop by a factor 500, because these losses are proportional to the fluid density. The exit velocity can therefore be much higher, and thus likewise the velocity through the turbine. The turbine can therefore be much smaller and cheaper.

The valve losses also will also drop by a factor 500, since again these losses are proportional to fluid density. The flow velocity through the valves can therefore be increased, making these much smaller and cheaper.

A particular configuration of the wave energy device will now be considered in more detail below. In this discussion, the following parameters will be used:

Static pressure head of water in main tube 2 (above water outside) is 6 m

Maximum pressure head between accumulators 32, 32' is 6 m

Static pressure of air in chamber is the same as the water pressure on the axis 8 of main tube 2

Figure 4:
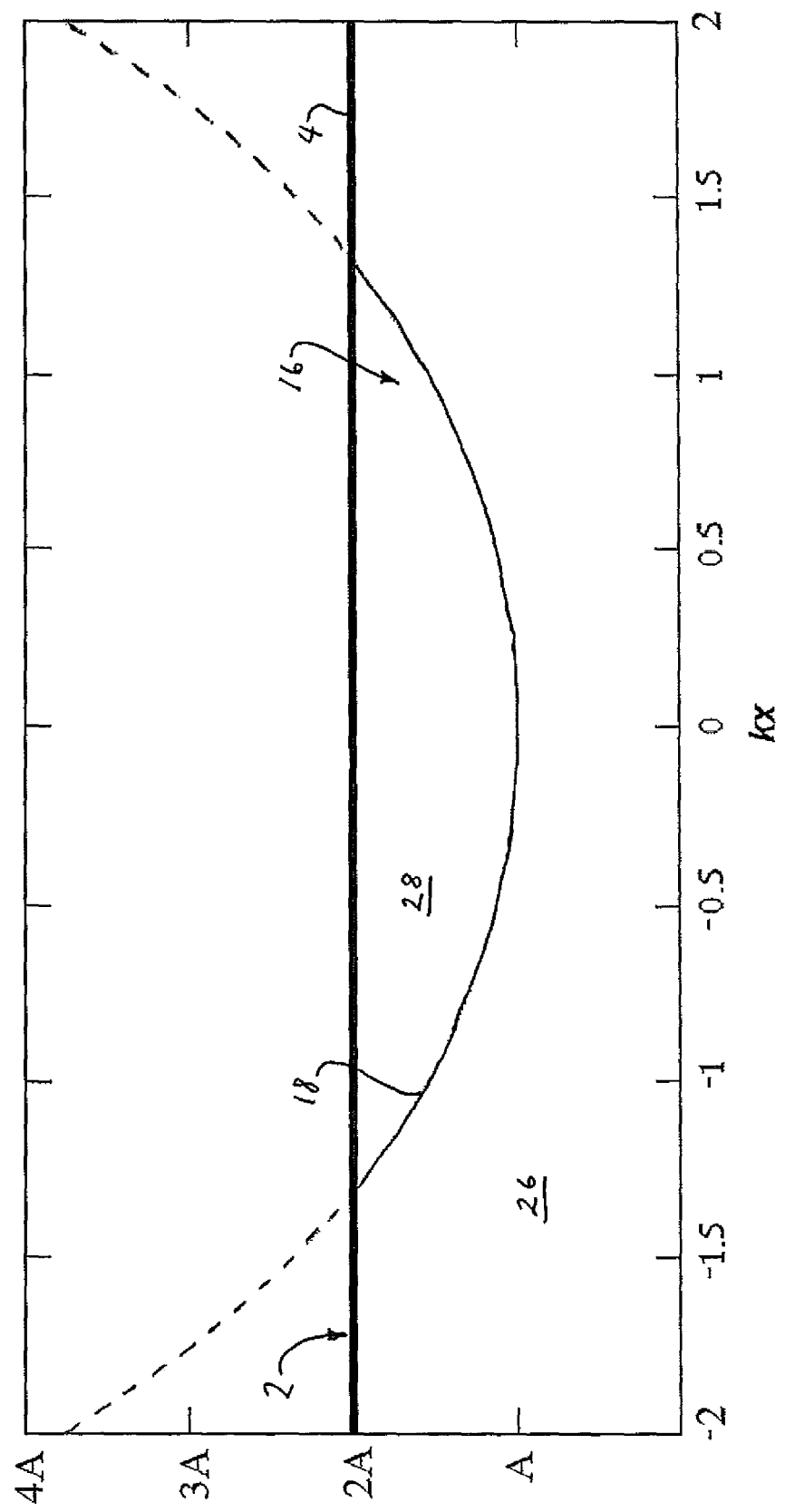
FIG. 4 shows the results of a mathematical model of the longitudinal shape of the chamber within the tubular body.

The shape of the chambers 16 in longitudinal section is shown in FIG. 4. The pressure difference between the channel water 26 and chamber air 28 across the inner wall 18 of the chamber 16 is carried by the longitudinal tension in its reinforcement. In a vertical longitudinal section through the tube axis, the inner chamber wall is therefore a catenary, as illustrated in FIG. 4, where the catenary curve is shown extending in dashed lines beyond the outer tube wall 4.

If the horizontal coordinate along the device is x, with x=0 at the centre of the chamber 16, and the vertical coordinate is y, then the shape of the chamber is:

$$y = A \cos h(kx) \quad (1)$$

If the radius of the tube is R (in this example, 2.5 m), and its static pressurisation head is H (in this example 6 m) then the longitudinal tension in the tube wall (and thus the chamber membrane), per unit circumference, is:

$$\rho g H \pi R^2 / (2\pi R) = \rho g H R / 2 \quad (2)$$

This tension, times the longitudinal chamber curvature $d^2y/dx^2 = k^2 y$, is the pressure difference across the chamber membrane. The water pressure is $-\rho g y$, so the air pressure is:

$$\rho g H R k^2 y / 2 - \rho g y = \rho g (H R k^2 / 2 - 1) y \quad (3)$$

which is zero if $HRk^2/2 - 1 = 0$, i.e. if:

$$k = \sqrt{2/(HR)} = \sqrt{2/(6 \times 2.5)} = 0.365 \text{ m}^{-1} \quad (4)$$

The air pressure is then everywhere equal to the water pressure at the depth y=0. In static conditions, this depth is chosen to correspond to the tube axis 8, see FIG. 1. On the centre axis 8 of the device 1, the maximum vertical thickness 39 of the chamber in the static condition is chosen as half a tube radius (1.25 m), so the lowest point of the chamber is also half a tube radius (1.25 m) above the tube axis, in static conditions.

Thus A=1.25 m in FIG. 4, and the limits of the catenary are at y=2A, as shown in the drawing. Thus the limits of kx are $\pm \cos h^{-1}(2) = 1.317$. Since $k=0.365$ m$^{-1}$, the limits of x are $\pm 1.317/0.365 = 3.61$ m. The length 41 chamber is thus 7.22 m (about 1.5 tube diameters) long, and its end-slope in static conditions is $\tan^{-1}\{1.25 \times 0.365 \times \sin h(1.317)\} = 38°$.

The shape of the chambers 16 in a transverse direction can also be calculated using similar arguments apply to a longitudinal cross-section through the tube axis 8 which is rotated (about the tube axis) to an angle θ to the vertical. Rather than the vertical coordinate, y is now the radial coordinate, so that ρgy on the LHS of equation (3) becomes ρgy cos θ, and thus in equation (4) k becomes 0.365√(cos θ)m$^{-1}$. If the same chamber limits x=±3.61 m are maintained, then equation (1) on the tube wall gives:

$$2.5 = A \cos h\{0.365\sqrt{(\cos \theta)}3.61\}, \text{ or } A = 2.5/[\cos h\{0.365\sqrt{(\cos \theta)}3.61\}] \quad (5)$$

Figure 5:
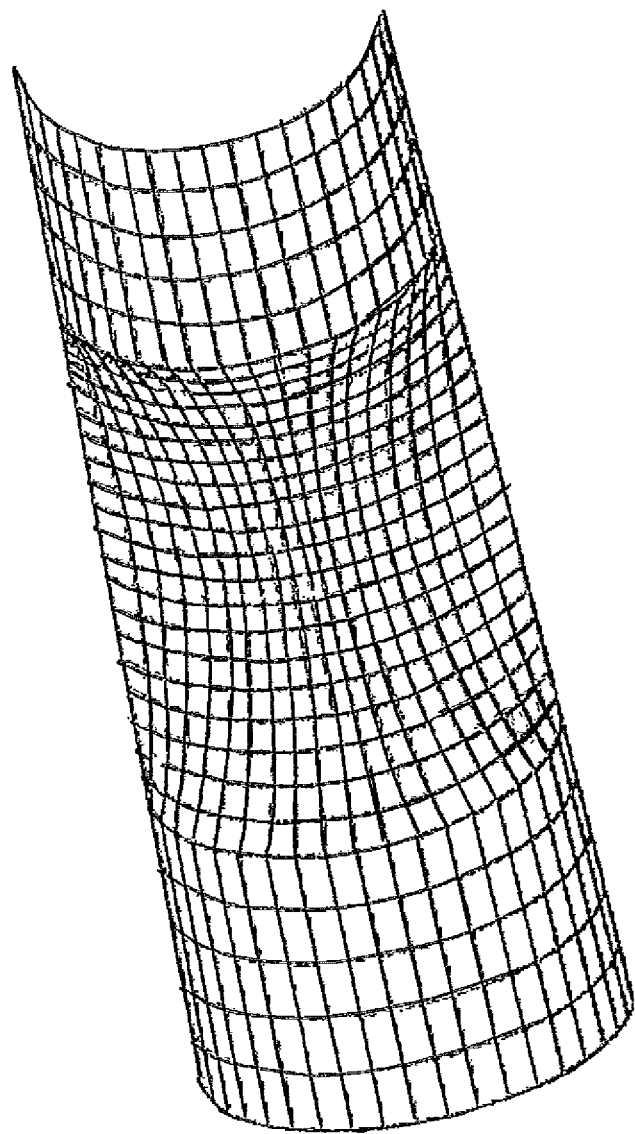
FIG. 5 shows a the internal shape of one chamber represented as a mesh.

From this value of A, the shape of the chamber 16 can be plotted using a mathematical CAD program. The result is shown schematically in FIG. 5. The volume of the chamber 16 can also be computed, and in this example is 20.1% of the total internal volume of the tubular body 2.

In the static condition, the tube therefore floats with the top of the tubular body 2 being a distance 43 that is 1.28 m above the still water line 15, as shown in FIG. 1, since:

$$\cos^{-1}((2.5-1.28)/2.5)/180 - (2.5-1.28)\sqrt{(2.5^2-(2.5-1.28)^2)}/(\pi 2.5^2) = 0.202 \quad (6)$$

The tube axis 8 is therefore a distance 45 of 2.5−1.28=1.2 m below the still water line 15, and the air pressure in the chamber 16 above atmospheric is the water pressure there, which is this 1.2 m head, plus the static pressurisation of the tube which is 6 m head, giving 1.2+6=7.2 m head in total. The maximum pressurisation of the high and low pressure accumulators 32, 32' are therefore 7.2+3=10.2 m head and 7.2−3=4.2 m head respectively, since the maximum pressure difference between them as in this example is 6 m head.

It is now possible to consider the chamber behaviour in operation during extreme high energy wave conditions. When the chamber 16 has been completely deflated into the high pressure accumulator 32, the chamber has no pressure difference across it (since it has no longitudinal curvature) so the water pressure at the top of the tube 19 is the same as that in the high pressure accumulator 32, i.e. 10.2 m head. Since the water level 15 outside is now the top of the tube 2 (because it no longer has any air in it providing buoyancy), the tube is pressurised to 10.2 m head above the water outside, which is 10.2−6=4.2 m above its still-water value.

In this example, to achieve the correct bulge wave speed for high energy wave conditions, the distensibility of the tube 2 in the static condition with the valves 34, 34' both closed is required to be 0.00661 kPa$^{-1}$ The change in water cross-sectional area produced by this pressure is then 4.2ρg0.00661=27.9%. This is in addition to the fractional increase in water cross-sectional area produced by the deflation of the chamber, which is 20.1/(100−20.1)=25.2%. Thus, in total there is an increase of water cross-sectional area of 27.9+25.2=53.1%, so the overall effective distensibility is 0.531/(4.2ρg)=0.0126 kPa$^{-1}$, which is an increase over the original (closed-valve) distensibility of 0.00661 kPa$^{-1}$, by a factor 0.0126/0.00661=1.91.

So in these extreme conditions the channel 6 is non-linearly detuned by the action of the chamber 16. The bulge wave speed changes from the normal (closed-valve) value of 12.3 m/s to 12.3/√1.91=8.9 m/s. This is the speed of a water wave of period 8.9/(g/2π)=5.7 s. Large waves of this period will occur in waves of energy period Te of 5.5 s, for which the highest expected significant wave height along the Hebridean or Cornish coats is 2.25 m. The most onerous credible event in these conditions would be a nearly-regular series of waves of height 1.5×2.25=3.4 m. Their peak vertical velocity would be (2π/5.7)×(3.4/2)=1.87 m/s.

Over the length of a chamber, the weight of water in static conditions is $(1-0.201) \times 7.22 \times \pi 2.5^2 \rho g = 1140$ kN, and its variation for such extreme bulges is 53.1% of this which is $0.531 \times 1140 = 605$ kN. The average power input to the bulge, in the optimum phase (riding on the front face of the wave) is $\frac{1}{2} \times 1.87 \times 605 = 566$ kW. This compares with the power absorbed by the chamber, which pumps $2 \times 0.201 \times 7.22 \times \pi 2.5^2 = 57$ m³ of air every 5.7 seconds across a pressure difference of $6\rho g = 60$ kPa, thus absorbing a power $57 \times 60/5.7 = 600$ kW. From this, it can be seen that the wave energy device 1 will never reach the mechanical limits of the chambers 16, even in the most extreme expected conditions along the Hebridean or Cornish coasts.

In practice it may, in any event, be desirable to "depressurise" the device in the most extreme storms, to stop power production and thus limit the mooring loads. This is relatively easy to do, since the device has no water valves, so its working fluid can be seawater, which can readily be pumped in and out.

In typical operating conditions, the performance of the wave energy device 1 is as follows. A typical operating condition at both the Hebrides and Cornish coasts would have waves with period Te=8 s and height Hs=2 m. The average wave height is (from the Rayleigh distribution) 0.63 Hs, thus the average wave has a peak vertical velocity of $(2\pi/8) \times (0.63 \times 2)/2 = 0.49$ m/s. Experimental results show that just as valves start to open, the amplitude of the bulge wave 30, 30' will be 3 m head, and the change in cross-section $3\rho g 0.00661 = 20.0\%$. The variation in the weight of the tube 4, over the length of a chamber 16, is therefore $0.20 \times (1-0.201) \times 7.22 \times \pi 2.5^2 \rho g = 228$ kN, and the average power input to the bulge 30, 30', in the optimum phase (riding on the front face of the wave and with an expected bulge-wave speed of 12.3 m/s, corresponding to a wave of period $12.3 \times 2\pi/g = 7.9$ s, which is close to Te=8 s) is thus $\frac{1}{2} \times 0.49 \times 228 = 56$ kW. Over its 400 m total length, the tube has $400/7.22 = 55$ chambers 16, of which perhaps 30 chambers, towards the rear of the tube, will be extracting power (in the front part of the tube, the bulge waves will still be growing). Thus the absorbed power will be $30 \times 56 = 1680$ kW.

An individual chamber 16, however, will only be pumping a volume of $56 \times 8/6 \mu g = 7.4$ m³ per cycle, on average, compared with its pumping capacity of 57 m³ at maximum stroke (as described above). The chamber thickness 39 at the tube top centre 17 will therefore change, on average, by $\pm 1.25 \times (7.4/57) = \pm 0.16$ m from its 1.25 m thickness 39 in static conditions (see FIG. 1). The maximum average chamber thickness will therefore be 1.41 m and the minimum average will be 1.09 m. Thus, there is scope for this to increase as the wave height increases above Hs=2 m.

The chamber thickness variation could double, for example, when Hs=4 m, which would cover over 95% of the occurrences of waves with Te in the 7 to 9 second range, in both the Hebrides and Cornish Coast wave climates (over 98% in the latter). At this wave height the vertical water velocity in the wave will double, and thus the power too, although the effect of non-linear detuning as described above will start to be noticeable, which will reduce the power (although more than 30 chambers will now be working, which will compensate to some extent). The power in the waves will quadruple, however, since this is proportional to Hs², so the capture width will halve—the distributed power take-off is then effectively shedding power in the higher waves.

The low density of air permits a high turbine duct exit velocity, without excessive kinetic energy losses. At the assumed static pressure of 7.2 m head, the density of air is 0.0022 tonne/m³, so the turbine duct exit velocity could be 50 m/s, for example, which would give a pressure loss of $\frac{1}{2} \times 0.0022 \times 50^2 = 2.8$ kPa, i.e. 0.28 m head, which is less than 5% of the working turbine head of 6 m. The volume flow rate at a power of 1000 kW is $1600/(6 \mu g) = 26.5$ m³/s, which at the flow velocity of 50 m/s only requires a duct area of $26.5/50 = 0.53$ m². With a small diffuser, this corresponds to a turbine diameter of only 0.7 m. A use of a simple single-stage (1 stator, followed by 1 rotor) turbine would therefore be feasible. This is confirmed by a consideration of the operating head of 6 m which implies a swirl velocity of $\sqrt{(6g1.025/0.0022)} = 166$ m/s, which means a blade angle at the trailing edge of $\tan^{-1}(166/50) = 73°$, which is at the upper end of conventional practice. The rotational speed would be about $166/0.25 = 660$ rad/s $= 660 \times 60/2\pi = 6{,}300$ rpm, and a typical efficiency (before duct exit losses) would be 95%, at the design head and flow rate.

Such a turbine is much smaller, lighter and cheaper than a water turbine of the same power operating at the same head. It would therefore be economically feasible to have turbines, with diameters of 0.5 m, 0.7 m and 1 m, say, so that these were rated at 500 kW, 1 MW and 2 MW, which would allow powers of up to 3.5 MW to be captured, in steps of 500 kW.

Regarding the material to be used in the tube, this can be formed from a rubber material similar to that used in motor vehicle tyres, reinforced circumferentially at the sides with a nylon material. Rubber panels in the top and bottom portions of the tube would not be reinforced so that the tube may bend with the waves. The static pressure of 6 m head and extreme pressures of ±4.2 m head, imply that the rubber segment in the tube top and bottom portions could be operated at 150% static strain, and $\pm 150 \times (4.2/6) = \pm 105\%$ extreme dynamic strain. Within such limits, experimental tests show that this will give an excellent fatigue life.

It should be noted that the compressibility of the air in the chamber adds to the effective distensibility of the channel walls. The chamber is at a static pressure of 7.2 m head, which is 17.2 m absolute head, which is equal to $17.2g = 170$ kPa. The chamber's volume will therefore decrease by a factor at 1/170 at an additional pressure of 1 kPa. Since its cross-sectional area is 25.2% of the water cross-section, its contribution to tube distensibility is $0.252/170 = 0.0015$ kPa⁻¹. This is about a quarter of the required tube distensibility of 0.00661 kPa⁻¹. This means less rubber is required. Therefore, about ¾ of the distensibility is provided by the tube and ¼ by the chamber.

Any longitudinal motions of the air in the chambers should not adversely affect the propagation of bulge waves in the tube. The chamber will have a longitudinal "sloshing" period, which is similar to the sloshing of a tank of the same length (7.22 m). This period is $\sqrt{(2\pi 7.22 \times 2/g)} = 3.0$ s, but the chamber period will be shorter, because the energy in the motion is stored elastically as well as gravitationally. The bulge waves of interest are of a longer period than this (e.g. 8 s), so the bulges should not be adversely affected. There will be a slight change in the bulge wave speed (requiring a compensating change in the distensibility of the tube), but no energy loss.

The drag forces on the chambers should not adversely affect the propagation of bulge waves in the tube. On the centre axis 8, the longitudinal cross-section of the bulge wave resembles that of a cylinder of diameter about $3.61^2/1.25 = 10.4$ m. Oscillatory flow will begin to separate behind such a cylinder, causing drag, once the peak-to-peak water motion reaches a similar magnitude, i.e. 10.2 m (this is a conservative estimate, since the chamber only represents the outer portion of the cylinder). This corresponds to a peak-to-peak pressure head of about 10 m, which is beyond the range of interest here (the extreme pressure in this example is ±4.2 m head)

The duct losses will be negligible. At 1 MW, the volume flow though the air ducts is 26.5 m$^3$/s, see Section 7. Since the duct diameter in this example is 2.5 m, this corresponds to a duct velocity of $26.5/(\pi 2.5^2/4)=5.4$ m/s. This will give a duct loss of $\frac{1}{2} \times 0.0022 \times 5.4^2 = 0.032$ kPa=0.0032 m head, every 30 diameters or $30 \times 2.5 = 75$ m. With a 400 m long device, and with the turbine provided in the middle, there would be approximately 200 m of ducting, on average, on both turbine inlet and exit, so 400 m in all, which would give a total loss of $0.0032 \times 400/75 = 0.017$ m head. This is a $0.017/6=0.28\%$ loss, which is negligible. Evan at the calculated peak power output of 3.5 MW, the loss is still only $0.28 \times 3.5^2 = 3.5\%$.

The accumulator volume from the ducts is sufficient to average out the power received from the chambers. The volume of the two ducts is $2 \times 400 \times \pi 2.5^2/4 = 4000$ m$^3$, and their pressurisation is 3 m head, i.e. 30 kPa, which compares with a static pressure of 170 kPa absolute (see equation (1) above). The accumulator energy storage is therefore $\frac{1}{2} \times 4000 \times (30/170) \times 30 = 10$ MJ. This corresponds to 10 seconds of power output of 1 MW, and appears sufficient given the distributed nature of the power take-off (55 chambers, covering 4 wavelengths).

The arrangement described above provides a number of advantages. By providing buoyant chambers and accumulators in an upper portion of the wave energy device, the vertical orientation of the tubular body is consistently maintained along the length of the body, thereby preventing twisting of the tubular body.

Another advantage is the ability to control the distensibility of the chambers, and hence tune the natural propagation velocity of the bulge waves, by controlling the air pressure in the accumulators. A higher operating air pressure in the accumulators will lead to a higher minimum and maximum pressure within each of the chambers that is in alternating communication with the accumulators. A higher chamber pressure will decrease the distensibility of the chambers under the action of the bulge wave which will raise the natural bulge wave velocity, and similarly lower pressure will be matched to lower bulge wave velocities. This is particularly convenient, because higher energy wave patterns have in general a longer wavelength and greater wave velocity, and the higher operating air pressures will, for a given volume of air flow through the turbine, be capable of drawing more power from the bulge wave, thereby helping to limit bulge wave energy and effectively draw energy from the bulge wave along the length of the tubular body. This tuning could be accomplished by active control of valves controlling the air flow to or from the turbine(s) or by control of turbine features such as blade angle or a turbine bypass circuit.

There may also be times when it is desirable to de-tune the bulge wave propagation velocity with respect to the surface waves so that the device does not effectively capture wave energy, for example, when the wave energy device is out of service, for example because of low demand from the electricity supply grid or for servicing of components, when the surface waves are too energetic in order to prevent the bulge waves from getting to large or otherwise to prevent damage to the wave energy device.

It may also be possible to selectively tune portions of the tubular body, for example by having more than one set of accumulators or by selectively inflating certain chambers that are not being used to extract power from the bulge wave.

It should be noted that although the accumulators have been illustrated schematically as having a circular cross-section, these may have any other suitable cross-section, shape or configuration. In particular, accumulators having a flatter profile would be desirable from the point of view of minimising any tendency of the upper portions of the wave energy device to catch and be moved about by the wind or by cross-waves. This would reduce the expected loading on the device in a direction transverse to the length of the tubular body and therefore help to reduce the cost of the device. Accumulators having a substantially flattened cross-section or which conform to the convex circumferential shape of the generally circular cross-section tubular body would also be able to bend more readily in a longitudinal vertical plane, thereby helping the wave energy device to follow the undulating surface waves.

Another advantage of the invention is that all the electrical components can be kept out of the water and incorporated in a mooring structure at the head of the device. This is because the distributed power take off along the length of the tubular body may be arranged to convey the fluid pressure to any part of the wave energy device, and this most conveniently can be the point where the device is moored, for example at a piling or pier fixed to the seabed. The electrical parts of the energy harnessing means can then be securely housed as part of the mooring.

The use of a gas such as air as the fluid medium does have certain advantages over the use of a liquid as the fluid medium, in particular being buoyant and easily transmissible. Air is also compressible, with the result that the inner walls of the chamber will be distensible at all times, even when no valve is open to admit or release air from a chamber. A gas system will also minimise corrosion of metal components, and may be sealed to prevent water ingress. However, gas turbines are inherently less efficient than liquid turbines, and so it may be desirable to use water as the working medium if turbine efficiency is a primary consideration.

It is to be recognized that various alterations, modifications, and/or additions may be introduced into the constructions and arrangements of parts described above without departing from the spirit or scope of the present invention, as defined by the appended claims.

The invention claimed is:

1. A wave energy device for extracting energy from surface waves in a body of water, comprising:
    (a) an elongate and flexible tubular body comprising an outer wall, a channel within the outer wall that extends along a length of the tubular body, and a plurality of deformable chambers within the outer wall that are spaced along at least a portion of the length of the tubular body, the chambers being separated from the channel and capable of holding a fluid;
    (b) means for positioning said tubular body along a surface of the body of water in a direction of the waves; and
    (c) energy harnessing means for providing useful power from the bulge wave, comprising at least one accumulator for receiving or providing a flow of the fluid from or to at least one of the chambers, a means for controlling the flow of fluid into and from the accumulator, and an energy conversion device for providing power from the flow of fluid to extract energy from pressure changes in the fluid;

wherein the wave energy device is adapted to be positioned along the surface of the body of water such that water contained within the channel is driven by the waves to form a series of bulge waves that travel along a length of the channel as the flexible tubular body flexibly follows a movement of said waves, a volume of each chamber is alternately compressed and expanded by the travelling bulge waves with consequent changes of pressure in the fluid held by each chamber as each of the bulge waves travel along the length of the channel, and the energy conversion device extracts energy from the bulge waves as each bulge wave travels along the length of the channel.

2. A wave energy device as claimed in claim 1, in which each of the chambers is separated from the channel by an inner wall, the inner walls affixed to the outer wall around a periphery of the corresponding chamber.

3. A wave energy device as claimed in claim 1, in which a stiffness of the outer wall in a circumferential direction is greater than the stiffness of the outer wall in a longitudinal direction.

4. A wave energy device as claimed in claim 3, in which the outer wall is formed of an elastomeric material with circumferential reinforcement to limit circumferential expansion of the outer wall.

5. A wave energy device as claimed in claim 1, in which each of the chambers is separated from the channel by an inner wall, the inner wall being movable relative to the outer wall so that a transverse cross-sectional area of the channel can expand and contract as each bulge wave travels along the length of the channel, the energy harnessing means thereby being driven by the movement of the inner wall.

6. A wave energy device as claimed in claim 5, in which the inner wall is relatively more distensible than the outer wall.

7. A wave energy device as claimed in in claim 5, in which the inner wall is saddle-shaped.

8. A wave energy device as claimed in claim 1, in which the fluid is a gas, the chambers being provided in an upper portion of the tubular body.

9. A wave energy device as claimed in claim 8, in which the chambers provide buoyancy to the wave energy device.

10. A wave energy device as claimed in claim 9, in which the buoyant chambers maintain the wave energy device in a partially submerged condition when positioned in the body of water.

11. A wave energy device as claimed in claim 1, in which there is a pair of accumulators, one for receiving a flow of the fluid from at least one of the chambers when compressed by an approach of the bulge wave, and one for providing a flow of the fluid to at least one of the chambers when expanded by a passage of the bulge wave.

12. A wave energy device as claimed in claim 11, in which the fluid is a gas, and the pair of accumulators is provided above the tubular body to provide buoyancy to the wave energy device.

13. A wave energy device as claimed in claim 11, in which each accumulator extends along the length of the tubular body.

14. A wave energy device as claimed in claim 11, in which each accumulator is capable of distributing the energy extracted from the fluid held by the plurality of chambers as each bulge wave travels along the length of the channel.

15. A wave energy device as claimed in claim 11, in which the means for controlling the flow of the fluid comprises at least one one-way valve between each of the chambers and the accumulators, wherein the at least one one-way valve is automatically actuatable by a pressure difference across the at least one one-way valve.

16. A wave energy device as claimed in claim 15, in which the at least one one-way valve is a flap valve.

17. A method of extracting energy from surface waves in a body of water using a wave energy device as defined in claim 1, the method comprising the steps of:
 positioning the tubular body of the wave energy device in the body of water so that the tubular body extends along the water surface in the direction of surface waves with water contained within the channel being driven to form the series of bulge waves that travel along the length of the channel as the flexible tubular body flexibly follows the movement of the waves, the volume of said chambers expanding and contracting in response to the travelling bulge waves with consequent changes of pressure in the fluid held by each chamber;
 extracting energy from the bulge waves as each bulge wave travels along the length of the channel by using the energy harnessing means to provide the power from energy extracted from the pressure changes in the fluid.

* * * * *